(12) United States Patent
Hattori et al.

(10) Patent No.: US 7,371,791 B2
(45) Date of Patent: May 13, 2008

(54) RUBBER COMPOSITION AND PNEUMATIC TIRE USING THE SAME

(75) Inventors: Takayuki Hattori, Kobe (JP); Toshiaki Sakaki, Kobe (JP); Naoya Ichikawa, Kobe (JP); Takao Wada, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 11/593,479

(22) Filed: Nov. 7, 2006

(65) Prior Publication Data

US 2007/0123636 A1   May 31, 2007

(30) Foreign Application Priority Data

Nov. 29, 2005   (JP) .............................. 2005-343418

(51) Int. Cl.
*C08L 25/10* (2006.01)

(52) U.S. Cl. .................. 524/274; 524/270; 524/68; 524/77

(58) Field of Classification Search ............ 524/68, 524/77, 270, 274
See application file for complete search history.

(56) References Cited

U.S. PATENT DOCUMENTS

| | | | |
|---|---|---|---|
| 4,052,549 A | 10/1977 | Booth | |
| 4,373,041 A | 2/1983 | Wood et al. | |

FOREIGN PATENT DOCUMENTS

| | | | |
|---|---|---|---|
| EP | 0 075 771 A1 | | 9/1982 |
| EP | 1 371 480 A1 | | 12/2003 |
| EP | 1 382 654 A1 | * | 1/2004 |
| EP | 1 382 654 A1 | | 1/2004 |
| EP | 1 424 219 A1 | | 6/2004 |
| EP | 1 424 219 A1 | * | 6/2004 |
| EP | 1 514 901 A1 | | 3/2005 |
| EP | 1 514 901 A1 | * | 3/2005 |
| JP | 60-158281 A | | 8/1985 |
| JP | 07-216140 A | | 8/1995 |
| JP | 07-292167 A | | 11/1995 |
| JP | 11-029657 A | | 2/1999 |
| JP | 11-269308 A | | 10/1999 |
| JP | 2003-064222 A | | 3/2003 |
| JP | 2004-352995 A | | 12/2004 |

* cited by examiner

*Primary Examiner*—Ling-Sui Choi
(74) *Attorney, Agent, or Firm*—Birch, Stewart, Kolasch & Birch, LLP

(57) ABSTRACT

A high performance rubber composition using a plasticizer derived from resources other than petroleum and a pneumatic tire using the same are provided. The rubber composition includes a rubber component containing at least 50% by weight of a natural rubber and/or a modified natural rubber and a terpene (co)polymer having a number average molecular weight of at most 700, and a pneumatic tire containing the same.

9 Claims, No Drawings

RUBBER COMPOSITION AND PNEUMATIC TIRE USING THE SAME

BACKGROUND OF THE INVENTION

The present invention relates to a rubber composition and a pneumatic tire.

Aromatic oil has been conventionally used as a plasticizer in a rubber composition for a tire, however, since aromatic oil is required to be replaced because of carcinogenicity problem and the like, respective tire companies are going to implement countermeasure in Japan at present to a direction of changing to use various oils (alternative aromatic oil) derived from petroleum having a similar structure. However, the alternative aromatic oil also still depends on petroleum resources. Further, when petroleum oil is compounded in a rubber composition containing a natural rubber in particular, rolling resistance of tires is increased (rolling resistance property is deteriorated) and fuel cost tends to be poor. Further, both of the aromatic oil and alternative aromatic oil still have problems to be improved in performance such as filler dispersibility, abrasion resistance in tread use and crack resistance in sidewall use, in particular, in a rubber composition containing a natural rubber, in particular, a rubber composition containing a natural rubber and silica.

Further, global environmental problems have been recently emphasized and since a new plasticizer replacing the petroleum oil has been required, it is preferable to replace it with a vegetable oil and the like which are ecological to environments. JP-A-2003-64222 discloses a rubber composition containing a vegetable oil and fat such as a soy bean oil and a palm oil. This is excellent in the viewpoint of considering environments, but abrasion resistance, filler dispersibility and crack resistance were greatly inferior in comparison with a case of compounding an aromatic oil.

SUMMARY OF THE INVENTION

An object of the present invention is to provide a high performance rubber composition using a plasticizer derived from resources other than petroleum and a pneumatic tire using the same.

The present invention relates to a rubber composition comprising a rubber component containing at least 50% by weight of a natural rubber and/or a modified natural rubber and a terpene (co)polymer having a number average molecular weight of at most 700.

It is preferable that the terpene (co)polymer is hydrogenated.

Further, the present invention relates to a pneumatic tire using the rubber composition.

DETAILED DESCRIPTION

The rubber composition of the present invention contains a rubber component and a terpene (co)polymer.

The rubber component used in the present invention contains a natural rubber (NR) and/or a modified natural rubber.

When NR which is not modified is included, an amount of the NR in the rubber component is preferably at most 85% by weight and more preferably at most 80% by weight. When the amount of the NR exceeds 85% by weight, a problem tends to occur in flex crack growth resistance and ozone resistance. Further, when it is used as a rubber composition for a tread, the amount of the NR is preferably at most 80% by weight and when it is used as a rubber composition for a sidewall, the amount of the NR is preferably 15 to 85% by weight.

As a modified natural rubber, examples are an epoxidized natural rubber (ENR), an episulfidized natural rubber, and a hydrogenated natural rubber (H-NR). These modified natural rubbers may be used alone and at least 2 kinds may be used in mixture. Among these, at least one of the rubber components selected from the group consisting of NR, ENR and H-NR are preferable from the viewpoints that effect excellent in abrasion resistance, fatigue resistance and flex crack growth resistance are obtained as for a tread or for a sidewall, further, environments can be considered and affinity with a terpene (co)polymer used in the present invention is high, and ENR is more preferable from the viewpoints that grip performance necessary for a tread can be obtained, an appropriate size sea-island structure is formed with NR for a sidewall use, flex crack growth resistance can be improved, and it can be commercially available at a comparatively low cost in comparison with other modified natural rubbers.

As ENR, a commercially available ENR may be used and NR may be epoxidized to be used. An process for epoxidizing NR is not specifically limited and can be carried out using processes such as a chlorohydrin process, a direct oxidation process, a hydrogen peroxide process, an alkylhydroperoxide process, and a peracid process. As the peracid process, an example is a process of reacting peracids such as peracetic acid and performic acid with NR.

An epoxidization ratio of ENR is preferably at least 3% by mol, more preferably at least 5% by mol, further preferably at least 10% by mol, and particularly preferably at least 15% by mol. When the epoxidization ratio is less than 3% by mol, the effect of modification tends to be lessened. Further, the epoxidization ratio is preferably at most 80% by mol and more preferably at most 60% by mol. When the epoxidation ratio exceeds 80% by mol, a polymer tends to be gelated.

When the modified natural rubber is contained for a tread use, an amount of the modified natural rubber is preferably at least 30% by weight in the rubber component, more preferably at least 50% by weight, and further more preferably at least 60% by weight. When the amount of the modified natural rubber is less than 30% by weight, effects such as improvement of grip performance tend to be insufficient. On the other hand, for a sidewall use, the amount of the modified natural rubber is preferably 15 to 85% by weight. For a sidewall use, an appropriate sea-island structure is formed with other rubbers such as NR by setting an amount of the modified natural rubber within the above-described range, and thereby, crack resistance can be improved.

An amount of NR and/or a modified natural rubber is at least 50% by weight in the rubber component, preferably at least 60% by weight, more preferably at least 75% by weight, and further preferably at least 85% by weight. When the amount of NR and/or a modified natural rubber is less than 50% by weight, a petroleum resource ratio becomes high on the whole, the characteristic of the present invention that environments are considered is not exerted, and the characteristic of a terpene (co)polymer that compatibility with NR and a modified natural rubber is good can not be applied.

A rubber component used in the present invention may contain a rubber other than NR and a modified natural rubber. As the rubber component other than NR and modified natural rubber, examples are a styrene-butadiene rubber (SBR), a butadiene rubber (BR), an isoprene rubber (IR), a butyl rubber (IIR), an ethylene-propylene-diene rubber (EPDM), an acrylonitrile-butadiene rubber (NBR), and a chloroprene rubber (CR). These rubber components may be used alone and at least 2 kinds may be used in mixture. Among these, as a rubber other than NR and/or a modified natural rubber, SBR and/or BR are preferable.

A styrene amount of SBR is preferably at least 10%, and more preferably at least 15%. When the styrene amount is less than 10%, sufficient grip performance tends to be hardly obtained when it is used for a tread. Further, the styrene amount is preferably at most 60%, and more preferably at most 50%. When the styrene amount exceeds 60%, abrasion resistance tends to be deteriorated when it is used for a tread.

As BR, BR with a high cis content in which a cis 1,4-bond is at least 90% is preferable. Flex crack growth resistance and aging resistance tend to be able to be improved by compounding the BR, in particular, in a tread use for an autotruck and a bus, and in a sidewall use including a use for a vehicle.

When a rubber component other than NR and a modified natural rubber is contained in the rubber composition of the present invention, an amount of SBR and/or BR is preferably at most 50% by weight in the rubber component, and more preferably at most 30% by weight. When the amount of SBR and/or BR exceeds 50% by weight, a petroleum resource ratio is high on the whole, and the characteristic of the present invention that environments are considered tends to be hardly exerted. In particular, when the rubber composition of the present invention is used as a rubber composition for a sidewall, the amount of BR is preferably at most 50% by weight, and more preferably at most 30% by weight since SBR cannot be generally used.

A terpene (co)polymer used in the present invention is obtained by (co)polymerizing terpenes such as monoterpenes, for example, dipentene such as limonene, α-pinene, β-pinene, 3-carene, terpinolene and myrcene, sesquiterpenes such as longifolene and caryophillene as a monomer.

The terpene (co) polymer can be a (co)polymer comprising only a monomer of terpenes but can be also a copolymer using a monomer of terpenes and a monomer other than terpenes.

Examples of a monomer other than terpenes are a naturally-derived monomer other than terpene such as rosin, a monomer derived from petroleum resource such as isoprene and phenol, and a monomer derived from coal such as coumarone. Among these, it is preferable that a monomer derived from petroleum resource and a monomer derived from coal are not used from the viewpoint of considering environments.

A (co)polymerization amount of terpenes in the terpene (co)polymer is preferably at least 50% by weight, more preferably at least 70% by weight, and further more preferably at least 80% by weight. When the (co)polymerization amount of terpenes is less than 50% by weight, besides that effects such as improvement of filler dispersibility, improvement of abrasion resistance and improvement of crack resistance are lessened, it tends to be not preferable form the viewpoint of considering environments.

As the terpene (co)polymer, it is preferable to be a terpene (co)polymer (co)polymerized with at least one monomer selected from the group consisting of α-pinene, β-pinene, limonene and terpinolene, and it is more preferable to be a terpene (co)polymer (co)polymerized with β-pinene and/or limonene. Particularly, a glass transition temperature of a terpene (co)polymer mainly comprising β-pinene is −30 to −45° C., and it is preferable since compatibility with NR, a modified natural rubber, and SBR is excellent.

Additionally, the terpene (co)polymer used in the present invention may be hydrogenated in order to improve thermal aging resistance, weather resistance, ozone resistance and the like. Particularly, ozone resistance is improved by rubber components mainly comprising NR and a modified natural rubber, and it becomes possible to make improvements suitable for social requirements concerning tire life. Further, when it is used for a sidewall, not only ozone resistance is improved, but also compatibility with NR and a modified natural rubber can be enhanced, lowering a SP value by hydrogenation, and crack resistance such as crack growth resistance and crack generation resistance can be improved.

When the terpene (co)polymer has a glass transition temperature (Tg), Tg of the terpene (co)polymer is preferably at least −60° C., more preferably at least −50° C., and further more preferably at least −45° C. When the glass transition temperature is less than −60° C., wet performance tends to be inferior. Further, Tg is preferably at most −10° C., more preferably at most −15° C., and further more preferably at most −20° C. When the glass transition temperature exceeds −10° C., it becomes excessively hard. Alternatively, it tends to be fragile at low temperature. Due to having the above-described Tg, the Tg is near to Tg of a modified natural rubber such as an epoxidized natural rubber and Tg of SBR (in general, −55 to −10° C.); therefore, favorable compatibility between the terpene (co)polymer and a rubber can be obtained, and also tan δ around at 50 to 70° C. relating to low fuel efficiency can be decreased. Further, when the terpene (co)polymer is used for a tread, tan δ around at 0° C. relating to wet skid performance is increased, and tan δ around at 50 to 70° C. relating to low fuel efficiency can be decreased.

A softening temperature of the terpene (co)polymer is preferably at most 30° C., and the terpene (co)polymer is preferably one in the liquid state at a room temperature. When the softening temperature of the terpene (co)polymer is more than 30° C., it tends to be excessively hard or to become fragile.

A number average molecular weight (Mn) of the terpene (co)polymer is preferably at least 150, more preferably at least 200, and further more preferably at least 250. When Mn is less than 150, the terpene (co)polymer contains a monomer, the monomer has a boiling point nearby a vulcanization temperature of a rubber, and it tends to be evaporated at vulcanization to be foamed. In addition, a reaction occurs at a double bond contained in the terpene (co)polymer, thus, it tends to luck stability and heat aging resistance. Further, it becomes difficult to prepare the terpene (co)polymer in which Tg is within the above-mentioned preferable range. Further, Mn is at most 700, preferably at most 600, more preferably at most 500, and further more preferably at most 400. When Mn exceeds 700, viscosity is increased, it is hardly used as a plasticizer and further, hardness of the obtained rubber composition is increased. Further, the number average molecular weight described referred herein indicates a molecular weight converted to polystyrene measured by gel permeation chromatography (GPC). In the present invention, as descried above, by using a terpene (co)polymer having a low molecular weight, dispersibility of a filler such as silica can be improved. Thereby, higher abrasion resistance can be also obtained. In addition, in a sidewall use, crack resistance such as crack growth resistance and crack generation resistance can be improved.

A hydrogenation ratio of the terpene (co)polymer is preferably at least 30% by mol, more preferably at least 50% by mol, further more preferably at least 70% by mol, particularly preferably at least 90% by mol, and the most preferably at least 95% by mol. When the hydrogenation ratio of the terpene (co)polymer is less than 30% by mol, effects due to hydrogenation can not be sufficiently obtained, remaining double bonds cause some kinds of reactions, or there is possibility to remain concerns with respect to stability, heat aging resistance, ozone resistance, oxidation degradation resistance and the like.

The terpene (co)polymer satisfying the above-described conditions is excellent in compatibility with NR and a modified natural rubber, thereby, effectively plasticized, and effects to impart more stable properties against thermal aging and change in time can be obtained. Accordingly, in particular, a synthesized rubber such as BR is decreased, and a problem of lowering of crack resistance when NR or a modified natural rubber is to be a main component can be solved.

The terpene (co)polymer used in the present invention may be used in combination with paraffin oils, naphthene oils, aromatic (aroma) oils, various alternative aromatic oils, vegetable oils such as soy bean oil and palm oil, alcohols synthesized from vegetable oils, and animal oils (and fats) such as fish oil and beef tallow and the like. As those used in combination, it is preferably used in combination with at least one selected from the group consisting of aromatic oil from the viewpoint of low price, vegetable oil such as soy bean oil and palm oil, alcohols synthesized from vegetable oils, and animal oil (and fat) such as fish oil from the viewpoint of considering environments. In particular, in a system containing a large amount of NR and a modified natural rubber, rolling resistance can be reduced and adhesivity and abrasion resistance can be improved by using the terpene (co)polymer in combination with the vegetable oil without excessively increasing hardness.

An iodine value of the vegetable oil used in the present invention is preferably 5 to 200, more preferably 30 to 150, and further more preferably 40 to 140. The vegetable oil having an iodine value of less than 5 tends to be hardly available. Further, when the iodine value exceeds 200, it tends that tan δ and hardness are increased and thermal aging property is deteriorated.

An amount of the terpene (co) polymer is preferably at least 0.5 part by weight based on 100 parts by weight of the rubber component, more preferably at least 1.5 parts by weight, further preferably at least 2.5 parts by weight, and particularly preferably at least 4 parts by weight. When the amount of the terpene (co) polymer is less than 0.5 part by weight, effects such as the improvement of dispersibility of a filler, the improvement of abrasion resistance and the improvement of crack resistance tend to be small. Further, the amount of the terpene (co) polymer is preferably at most 50 parts by weight, more preferably at most 40 parts by weight, further more preferably at most 20 parts by weigh, and particularly preferably at most 15 parts by weight. When the amount of the terpene (co)polymer exceeds 50 parts by weight, thermal aging resistance tends to be deteriorated. Further, in case of the rubber composition for a tread, the amount of the terpene (co)polymer is preferably 0.5 to 50 parts by weight and more preferably 1.5 to 40 parts by weight. Further, in case of the rubber composition for a sidewall, the amount of the terpene (co)polymer is preferably 0.5 to 20 parts by weight and more preferably 1.5 to 15 parts by weight.

The rubber composition of the present invention can compound a vegetable oil together with the terpene (co) polymer.

When the terpene (co)polymer is used in combination with a vegetable oil, an amount of the vegetable oil is preferably 2 to 40 parts by weight based on 100 parts by weight of the rubber component and more preferably 4 to 15 parts by weight. When the amount of the vegetable oil is less than 2 parts by weight, hardness of the rubber tends to be too hard. Further, when the amount of the vegetable oil exceeds 40 parts by weight, strength of the rubber tends to be excessively lowered.

It is preferable that the rubber composition of the present invention further contains an inorganic filler. Examples of the inorganic filler are carbon black, silica, calcium carbonate, sericite, alumina, magnesium carbonate, titanium oxide, clay, talc, magnesium oxide, and aluminum hydroxide. Among these, silica, calcium carbonate, sericite, alumina, magnesium carbonate, titanium oxide, clay, talc, magnesium oxide, and aluminum hydroxide are preferable from the viewpoints that environments can be considered and effects due to the terpene (co)polymer is easily enlarged. In particular, silica is preferable from the viewpoint that reinforcing property of the rubber is secured by being used in combination with a low molecular weight terpene (co) polymer.

When silica is used as an inorganic filler, a BET specific surface area of silica is preferably 20 to 600 $m^2/g$, more preferably 40 to 500 $m^2/g$, and further more preferably 50 to 450 $m^2/g$. When the BET specific surface area of silica is less than 20 $m^2/g$, reinforcing property tends to be inferior. Further, when the BET specific surface area of silica exceeds 600 $m^2/g$, dispersibility is inferior, and since it is coagulated, physical properties tend to be lowered.

An amount of the inorganic filler is preferably at least 5 parts by weight based on 100 parts by weight of the rubber component, and more preferably at least 30 parts by weight. When the amount of the inorganic filler is less than 5 parts by weight, reinforcing property tends to be not sufficiently secured. Further, the amount of the inorganic filler is preferably at most 150 parts by weight, more preferably at most 120 parts by weight, and further more preferably at most 100 parts by weight. When the amount of the inorganic filler exceeds 150 parts by weight, processability tends to be inferior. Further, in case of the rubber composition for a tread, the amount of the inorganic filler is preferably 30 to 150 parts by weight, and more preferably 50 to 120 parts by weight. Further, in case of the rubber composition for a sidewall, the amount of the inorganic filler is preferably 5 to 80 parts by weight, more preferably 15 to 65 parts by weight, and further more preferably 20 to 50 parts by weight.

The rubber composition of the present invention can suitably compound a silane coupling agent, stearic acid, zinc oxide, an antioxidant, wax and the like in addition to the rubber component, the terpene (co)polymer and the inorganic filler.

The rubber composition of the present invention is preferably used as a rubber composition for a tire and, in particular, it is preferably used for a tread and a sidewall in tires from the viewpoint that volume and weight are large as tire parts, and merits such as the improvement of dispersibility of silica, the improvement of abrasion resistance and the improvement of flex crack growth resistance can be utilized.

The pneumatic tire of the present invention is prepared by a usual process using the rubber composition of the present invention. Namely, the rubber composition of the present invention in which the above-described compounding agents are compounded if necessary is extruded and processed adjusting with a shape of a tread or a sidewall of tires at an unvulcanization stage, and molded on a tire molding machine by a usual process to form an unvulcanized tire.

The pneumatic tire of the present invention can be obtained by heat-pressurizing this unvulcanized tires in a vulcanizer.

As described above, by using the rubber composition of the present invention, the pneumatic tire of the present invention can be a ecological tire which can consider environments, and also can be provided for decrease in an amount supplied of petroleum resources in future.

EXAMPLES

The present invention is explained in detail based on Examples, however, the present invention is not limited to only thereto.

Chemicals used in Examples and Comparative Examples are shown in the following.

Styrene-butadiene rubber (SBR): NIPPOL NS116 (solution polymerized SBR, styrene content: 21% by weight, and glass transition temperature: −25° C.) available from ZEON Corporation.

Natural rubber (NR): RSS#3

Epoxidized natural rubber (ENR): ENR-25 (epoxidation ratio: 25% by mol, glass transition temperature: −41° C.) available from Guthrie Polymer sdn. bhd.

Silica: ULTRASIL VN3 (BET specific surface area: 175 m$^2$/g) available from Deggusa Huls Corporation.

Silane coupling agent: Si-69 (bis(3-triethoxysilylpropyl)tetrasulfide) available from Deggusa Huls Corporation.

Soy bean oil: SOY BEAN OIL (S) (iodine value: 131, fatty acid component having at least 18 carbons: 84.9% by weight) available from The Nisshin Oillio Group, Ltd.

Aromatic oil: PROCESS X-140 available from Japan Energy Corporation. Terpene (co)polymer (1): DIMERONE (number average molecular weight: 390, glass transition temperature: −38° C., without hydrogenation) available from YASUHARA Chemical Co., Ltd.

Terpene (co)polymer (2): a hydrogenated product (prepared by the following preparation process, hydrogenated product of terpene lower polymer, number average molecular weight: 390, glass transition temperature: −38° C., hydrogenation ratio: 99% by mol) of DIMERONE available from YASUHARA Chemical Co., Ltd.

Terpene (co)polymer (3): a hydrogenated product (prepared by the following preparation process, hydrogenated product of terpene phenol copolymer, number average molecular weight: 540, softening temperature: at most 30° C., hydrogenation ratio: 99% by mol) of YS POLYSTER T30 available from YASUHARA Chemical Co., Ltd.

Terpene (co)polymer (4): a hydrogenated product (prepared by the following preparation process, hydrogenated product of aromatic modified terpene copolymer, number average molecular weight: 640, glass transition temperature: −43° C., hydrogenation ratio: 99% by mol) of YS RESIN LP available from YASUHARA Chemical Co., Ltd.

Terpene resin: YS RESIN PX300N (a polymer of β-pinene, number average molecular weight: 2500, weight average molecular weight: 4800, softening temperature: 30° C., without hydrogenation) available from YASUHARA Chemical Co., Ltd.

Stearic acid: KIRI, available from NOF Corporation

Zinc oxide: ZINC OXIDE NO. 2 available from Mitsui Mining & Smelting Co., Ltd.

Antioxidant: NOCRAC 6C (N-1,3-dimethylbutyl-N'-phenyl-p-phenylenediamine) available from OUCHI SHINKO CHEMICAL INDUSTRIAL CO., LTD.

Wax: OZOACE 0355 available from NIPPON SEIRO CO., LTD.

Sulfur: SULFUR POWDER available from Tsurumi Chemical Industry Co., Ltd.

Vulcanization accelerator BBS: NOCCELER NS (N-t-butyl-2-benzothiazolylsulfenamide) available from OUCHI SHINKO CHEMICAL INDUSTRIAL CO., LTD.

Vulcanization accelerator DPG: NOCCELER D (diphenylguanidine) available from OUCHI SHINKO CHEMICAL INDUSTRIAL CO., LTD.

(Preparation of terpene (co)polymer (2))

1 to 5 g of N-103 (stabilized nickel powder) available from NIKKI CHEMICAL CO., LTD. was added based on 100 to 200 g of DIMERONE available from YASUHARA Chemical Co., Ltd., the mixture was stirred for 10 to 30 hours at 200 to 300° C. under pressurization with a gauge pressure of 30 kgf/cm$^2$ of pure hydrogen to prepare the terpene (co)polymer.

(Preparation of terpene (co)polymer (3))

The terpene (co)polymer (3) was prepared in the same manner as the terpene (co)polymer (2) except for using YS POLYSTER T30 available from YASUHARA Chemical Co., Ltd., in stead of DIMERONE available from YASUHARA Chemical Co., Ltd.

(Preparation of terpene (co)polymer (4))

The terpene (co)polymer (4) was prepared in the same manner as the terpene (co)polymer (2) except for using YS RESIN LP available from YASUHARA Chemical Co., Ltd., in stead of DIMERONE available from YASUHARA Chemical Co., Ltd.

EXAMPLES 1 to 8 and COMPARATIVE EXAMPLES 1 and 2

Chemicals with the compounding amounts shown in the step 1 of Table 1 were added so as to be a filling ratio of 58% and kneaded under a condition of a rotational number of 80 rpm for 3 to 8 minutes using a 1.7 L Banbury mixer available from Kobe Steel, Ltd. until a display temperature of the kneader reached 140° C. Further, after discharging the kneaded article once, the kneaded article obtained in the step 1 and silica and a silane coupling agent with the compounding amounts shown in the step 2 were added so as to be a filling ratio of 58%, and kneaded for 3 to 8 minutes until the display temperature of the kneader was 140° C.

Sulfur and vulcanization accelerators BBS and DPG with the compounding amounts shown in the step 3 of Table 1 were added to the mixture obtained by the step 2, and kneaded under a condition of 50° C. for 3 minutes using an open roll to obtain unvulcanized rubber compositions. The unvulcanized rubber compositions obtained in the step 3 were molded to sizes necessary for respective evaluations and press-vulcanized at 160° C. for 20 minutes to prepare the rubber compositions of Examples 1 to 8 and Comparative Examples 1 and 2.

EXAMPLES 9 TO 16 AND COMPARATIVE EXAMPLES 3 TO 5

Chemicals with the compounding amounts shown in the step 1 of Table 2 were added so as to be a filling ratio of 58% and kneaded under a condition of a rotational number of 80 rpm for 3 to 8 minutes using a 1.7 L Banbury mixer available from Kobe Steel, Ltd. until a display temperature of the kneader was 140° C. Further, silica was separated twice to be charged in the step 1.

Sulfur and vulcanization accelerator BBS with the compounding amounts shown in the step 2 of Table 2 were added to the mixture obtained by the step 1, and kneaded under a condition of 50° C. for 3 minutes using an open roll to obtain unvulcanized rubber compositions. The unvulcanized rubber compositions obtained in the step 2 were molded to sizes necessary for respective evaluations and press-vulcanized at 160° C. for 20 minutes to prepare the rubber compositions of Examples 9 to 16 and Comparative Examples 3 to 5.

EXAMPLES 17 TO 28 AND COMPARATIVE EXAMPLES 6 to 12

Chemicals with the compounding amounts shown in the step 1 of Tables 3 and 4 were added so as to be a filling ratio of 58% and kneaded under a condition of a rotational number of 80 rpm for 3 to 8 minutes using a 1.7 L Banbury mixer available from Kobe Steel, Ltd. until a display temperature of the kneader reached 140° C. Further, after discharging the kneaded article once, the kneaded article obtained in the step 1 and an epoxidized natural rubber with the compounding amounts shown in the step 2 were added so as to be a filling ratio of 58% and kneaded for 3 minutes under conditions of 70° C. and a rotational number of 80 rpm using a 1.7 L Banbury mixer available from Kobe Steel, Ltd., to obtain mixtures.

Then, sulfur and a vulcanization accelerator BBS with the compounding amounts shown in the step 3 were added to the mixture obtained by the step 2, and kneaded under a condition of 50° C. for 3 minutes using an open roll to obtain unvulcanized rubber compositions.

The unvulcanized rubber compositions obtained in the step 3 were molded to sizes necessary for respective evaluations and press-vulcanized at 160° C. for 20 minutes to prepare the rubber compositions of Examples 17 to 28 and Comparative Examples 6 to 12.

Measurements shown in the following were carried out using the above-described unvulcanized rubber compositions and vulcanized rubber compositions.

Further, rolling resistance test, filler dispersion and hardness measurement were carried out in respective measurements in the following using the rubber compositions of Examples 1 to 28 and Comparative Examples 1 to 12 and an adhesion force measurement was carried out using the rubber compositions before vulcanization (Tables 1 to 4). Further, abrasion resistance and wet skid tests were carried out using the rubber compositions of Examples 1 to 16 and Comparative Examples 1 to 5 (Tables 1 and 2), and tear test, DeMattia flex crack growth test and constant stretching fatigue test were carried out using the rubber compositions of Examples 17 to 28 and Comparative Examples 6 to 9 (Tables 3 and 4). Further, Comparative Example 1 in Table 1, Comparative Example 3 in Table 2 and Comparative Example 6 in Tables 3 and 4 were reference compositions respectively. The ozone resistance test was carried out also in Examples 1 to 28 and Comparative Examples 1 to 12.

(Rolling Resistance Test)

Vulcanized rubber slab sheets having a size of 2 mm×130 mm×130 mm are prepared as vulcanized rubber compositions, therefrom test pieces for measurement are cut out, using a viscoelasticity spectrometer (VES) (manufactured by Iwamoto Seisakusho Co., Ltd.), tan δ of the rubber compositions for respective tests are measured under the conditions of temperature at 70° C., an initial strain of 10%, a dynamic strain of 2%, and a frequency of 10 Hz. Then, rolling resistance is expressed as an index in accordance with the following calculation formula, assuming a rolling resistance index of the reference composition as 100. It indicates that the larger the index is, the lower the rolling resistance is, which is more excellent.

(Rolling resistance index)=(Tan δ of reference composition)/(Tan δ of respective compositions)×100

(Dispersion of Filler)

Rubber slab sheets having a size of 2 mm×130 mm×130 mm were prepared as the vulcanized rubber compositions, test pieces for the measurement were cut out, in accordance with JIS K 6812 "Method for the assessment of the degree of pigment or carbon black dispersion in polyolefin pipes, fittings and compounds", coagulated clusters of silica in the vulcanized rubber compositions were counted, dispersion ratios (%) were respectively calculated, and the dispersion ratios were respectively expressed as indices, assuming the dispersion ratio of the reference composition as 100. It is indicated that the larger the filler dispersion index is, the more the filler is dispersed, which is excellent.

(Hardness)

Hardness of the vulcanized rubber compositions was measured using a type A durometer in accordance with JIS K 6253 "Hardness testing methods for rubber, vulcanized or thermoplastic", the rubber hardness was expressed as an index by the following calculation formula, assuming an index of the reference compositions as 100. The larger the rubber hardness index is, the larger hardness is. It is not preferable if this index is largely out of 100.

(Rubber hardness index)=(Rubber hardness of respective compositions/Rubber hardness of reference compositions)×100

(Ozone Resistance Test)

In accordance with JIS K6259 "Rubber, vulcanized or thermoplastic—Determination of ozone resistance", the dynamic ozone degradation test was carried out, ozone resistance was evaluated by observing crack condition after conducting the 48 hours test under the conditions of a frequency of reciprocating motion at 0.5±0.025 Hz, a ozone concentration of 50±5 pphm, a test temperature at 40° C. and tensile strain at 20±2%. Further, alphabets A, B, C indicate the number of cracks. Alphabet A indicates that the number of cracks is small, and alphabet C indicates that the number of cracks is large. The number indicates the size of crack. Then, the larger the number is, the larger the size of a crack is. And "none" indicates that crack is not generated.

(Adhesion Force)

The adhesion force [N] of unvulcanized rubber compositions at a temperature of 23° C. and a relative humidity of 55% was measured under the conditions of a rising speed of 30 mm/min and a measurement time of 2.5 seconds using a PICMA tack tester available from Toyo Seiki Seishaku-sho, LTD., adhesion force was expressed as an index by the following calculation formula, assuming the adhesion force index of the reference composition as 100. It is indicated that the larger the adhesive force index is, the larger the adhesive force is, which is excellent.

(Adhesion force indices)=(Adhesion force of respective compositions/Adhesion force of reference compositions)×100

(Abrasion Resistance)

Vulcanized rubber test pieces for the Lambourn abrasion test obtained from the respective vulcanized rubber compositions were worn under the conditions of a load of 2.5 kgf, a temperature at 20° C., a slip ratio of 40%, and a test time of 2 minutes with a Lambourn abrasion tester, volume losses of respective compositions were respectively calculated, and the abrasion resistance were expressed as an index according to the following calculation formula, assuming the abrasion resistance index of the reference composition as 100. It is indicated that the larger the abrasion resistance index is, the more excellent abrasion resistance is.

(Abrasion resistance indices)=(Volume loss of reference composition)/(Volume losses of respective compositions)×100

(Wet Grip Performance)

Maximum friction coefficients of the respective rubber compositions were measured in accordance with the method of ASTM E303-83 using a portable skid tester available from Stanly Electric Co., Ltd., and expressed as indices, assuming the wet grip performance index of the reference composition as 100. The larger the wet grip performance index is, the more excellent the wet grip performance is.

(Wet grip performance indices)=(Numerical value of respective compositions/Numerical value of the reference composition)×100

(Tear Test)

By using angle test pieces without notches, tear strength [N/mm] is measured in accordance with JIS K6252 "Rubber, vulcanized or thermoplastics—Determination of tear strength". Then, tear strength is expressed as an index by the following calculation formula, assuming tear strength of the reference composition as 100. It indicates that the larger the tear strength index is, the larger the tear strength is, which is excellent.

(Tear strength indices)=(Tear strength of respective compositions)/(Tear strength of Comparative Example 6)×100

(DeMattia Flex Crack Growth Test)

Regarding samples of vulcanized rubber compositions, crack lengths after 1,000,000 times of tests, or the number of times until cracks grow 1 mm, are measured under the conditions of a temperature at 23° C. and a relative humidity at 55%, in accordance with JIS K6260 of "Testing method of flex cracking and crack growth for rubber, vulcanized or thermoplastic (DeMattia)". Based on the obtained number or crack length, the number of flex until 1 mm crack grows on the samples of the vulcanized rubber compositions was expressed as common logarithm indicates. Herein, 70% and 110% represent stretching ratios for original lengths of the samples of the vulcanized rubber compositions, and it indicates that as the common logarithm index is large, cracks hardly grow, and flex crack growth resistance is excellent.

(Constant Stretching Fatigue Test)

Constant strain repeating stretching test was carried out under the conditions of the maximum strain of 50% and a frequency of 5 Hz using a dumbbell No. 3 without providing initial crack. This was repeated 5 million cycles. Those fractured were referred to as X, those in which crack and damage were generated were referred to as Δ, and those having no abnormality were referred to as ○.

Test results are shown in Tables 1 to 4.

TABLE 1

| Compositions (part by weight) | Ex. | | | | | | | | Com. Ex. | |
| --- | --- | --- | --- | --- | --- | --- | --- | --- | --- | --- |
|  | 1 | 2 | 3 | 4 | 5 | 6 | 7 | 8 | 1 | 2 |
| Step 1 | | | | | | | | | | |
| SBR | 50 | 50 | 50 | 50 | 50 | 50 | 50 | 50 | 50 | 50 |
| NR | 50 | 50 | 50 | 50 | 50 | 50 | 50 | 50 | 50 | 50 |
| Silica | 50 | 50 | 50 | 50 | 50 | 50 | 50 | 50 | 50 | 50 |
| Silane coupling agent | 4 | 4 | 4 | 4 | 4 | 4 | 4 | 4 | 4 | 4 |
| Soy bean oil | 17.5 | — | 17.5 | — | 17.5 | — | 17.5 | — | 35 | — |
| Aromatic oil | — | — | — | — | — | — | — | — | — | 35 |
| Terpene (co)polymer (1) | 17.5 | 35 | — | — | — | — | — | — | — | — |
| Terpene (co)polymer (2) | — | — | 17.5 | 35 | — | — | — | — | — | — |
| Terpene (co)polymer (3) | — | — | — | — | 17.5 | 35 | — | — | — | — |
| Terpene (co)polymer (4) | — | — | — | — | — | — | 17.5 | 35 | — | — |
| Stearic acid | 2.0 | 2.0 | 2.0 | 2.0 | 2.0 | 2.0 | 2.0 | 2.0 | 2.0 | 2.0 |
| Zinc oxide | 3.0 | 3.0 | 3.0 | 3.0 | 3.0 | 3.0 | 3.0 | 3.0 | 3.0 | 3.0 |
| Antioxidant | 1.0 | 1.0 | 1.0 | 1.0 | 1.0 | 1.0 | 1.0 | 1.0 | 1.0 | 1.0 |
| Wax | 1.5 | 1.5 | 1.5 | 1.5 | 1.5 | 1.5 | 1.5 | 1.5 | 1.5 | 1.5 |
| Step 2 | | | | | | | | | | |
| Silica | 50 | 50 | 50 | 50 | 50 | 50 | 50 | 50 | 50 | 50 |
| Silane coupling agent | 4 | 4 | 4 | 4 | 4 | 4 | 4 | 4 | 4 | 4 |
| Step 3 | | | | | | | | | | |
| Sulfur | 1.9 | 1.9 | 1.9 | 1.9 | 1.9 | 1.9 | 1.9 | 1.9 | 1.9 | 1.9 |
| Vulcanization accelerator BBS | 1.0 | 1.0 | 1.0 | 1.0 | 1.0 | 1.0 | 1.0 | 1.0 | 1.0 | 1.0 |
| Vulcanization accelerator DPG | 0.5 | 0.5 | 0.5 | 0.5 | 0.5 | 0.5 | 0.5 | 0.5 | 0.5 | 0.5 |
| Rolling resistance index | 100 | 99 | 102 | 101 | 101 | 100 | 101 | 100 | 100 | 97 |
| Abrasion resistance index | 134 | 136 | 135 | 138 | 132 | 133 | 131 | 132 | 100 | 130 |

TABLE 1-continued

|  | Ex. | | | | | | | | Com. Ex. | |
| --- | --- | --- | --- | --- | --- | --- | --- | --- | --- | --- |
| Compositions (part by weight) | 1 | 2 | 3 | 4 | 5 | 6 | 7 | 8 | 1 | 2 |
| Wet grip performance index | 104 | 107 | 105 | 108 | 108 | 111 | 107 | 110 | 100 | 106 |
| Filler dispersion index | 111 | 115 | 112 | 116 | 114 | 118 | 113 | 117 | 100 | 110 |
| Rubber hardness index | 100 | 99 | 100 | 100 | 100 | 100 | 101 | 101 | 100 | 100 |
| Ozone resistance test | C-2 | C-2 | B-2 | B-2 | A-2 | None | B-2 | B-2 | C-2 | C-2 |
| Adhesion force index | 137 | 142 | 138 | 144 | 147 | 154 | 143 | 150 | 100 | 104 |

TABLE 2

|  | Ex. | | | | | | | | Com. Ex. | | |
| --- | --- | --- | --- | --- | --- | --- | --- | --- | --- | --- | --- |
| Compositions (part by weight) | 9 | 10 | 11 | 12 | 13 | 14 | 15 | 16 | 3 | 4 | 5 |
| Step 1 | | | | | | | | | | | |
| NR | 30 | 30 | 30 | 30 | 30 | 30 | 30 | 30 | 30 | 30 | 30 |
| ENR | 70 | 70 | 70 | 70 | 70 | 70 | 70 | 70 | 70 | 70 | 70 |
| Silica | 75 | 75 | 75 | 75 | 75 | 75 | 75 | 75 | 75 | 75 | 75 |
| Silane coupling agent | 6 | 6 | 6 | 6 | 6 | 6 | 6 | 6 | 6 | 6 | 6 |
| Soy bean oil | 5 | — | 5 | — | 5 | — | 5 | — | 10 | — | — |
| Aromatic oil | — | — | — | — | — | — | — | — | — | 10 | — |
| Terpene (co)polymer (1) | 5 | 10 | — | — | — | — | — | — | — | — | — |
| Terpene (co)polymer (2) | — | — | 5 | 10 | — | — | — | — | — | — | — |
| Terpene (co)polymer (3) | — | — | — | — | 5 | 10 | — | — | — | — | — |
| Terpene (co)polymer (4) | — | — | — | — | — | — | 5 | 10 | — | — | — |
| Terpene resin | — | — | — | — | — | — | — | — | — | — | 10 |
| Stearic acid | 2.0 | 2.0 | 2.0 | 2.0 | 2.0 | 2.0 | 2.0 | 2.0 | 2.0 | 2.0 | 2.0 |
| Zinc oxide | 3.0 | 3.0 | 3.0 | 3.0 | 3.0 | 3.0 | 3.0 | 3.0 | 3.0 | 3.0 | 3.0 |
| Antioxidant | 1.2 | 1.2 | 1.2 | 1.2 | 1.2 | 1.2 | 1.2 | 1.2 | 1.2 | 1.2 | 1.2 |
| Wax | 1.5 | 1.5 | 1.5 | 1.5 | 1.5 | 1.5 | 1.5 | 1.5 | 1.5 | 1.5 | 1.5 |
| Step 2 | | | | | | | | | | | |
| Sulfur | 1.8 | 1.8 | 1.8 | 1.8 | 1.8 | 1.8 | 1.8 | 1.8 | 1.8 | 1.8 | 1.8 |
| Vulcanization accelerator BBS | 2.1 | 2.1 | 2.1 | 2.1 | 2.1 | 2.1 | 2.1 | 2.1 | 2.1 | 2.1 | 2.1 |
| Evaluation | | | | | | | | | | | |
| Rolling resistance index | 99 | 98 | 101 | 101 | 100 | 99 | 100 | 99 | 100 | 97 | 83 |
| Abrasion resistance index | 110 | 111 | 112 | 113 | 108 | 108 | 107 | 107 | 100 | 106 | 77 |
| Wet grip performance index | 100 | 99 | 101 | 101 | 103 | 102 | 102 | 101 | 100 | 97 | 83 |
| Filler dispersion index | 112 | 115 | 113 | 117 | 115 | 118 | 114 | 117 | 100 | 111 | 91 |
| Rubber hardness index | 100 | 100 | 100 | 100 | 100 | 101 | 101 | 102 | 100 | 100 | 111 |
| Ozone resistance test | C-3 | C-3 | C-2 | B-2 | B-2 | A-2 | C-2 | B-2 | C-3 | C-3 | B-2 |
| Adhesion force index | 114 | 128 | 114 | 129 | 126 | 144 | 121 | 137 | 100 | 104 | 138 |

TABLE 3

|  | Ex. | | | | | | | | | | | |
| --- | --- | --- | --- | --- | --- | --- | --- | --- | --- | --- | --- | --- |
| Compositions (part by weight) | 17 | 18 | 19 | 20 | 21 | 22 | 23 | 24 | 25 | 26 | 27 | 28 |
| Step 1 | | | | | | | | | | | | |
| NR | 60 | 60 | 60 | 60 | 60 | 60 | 60 | 60 | 60 | 60 | 60 | 60 |
| Silica | 35 | 35 | 35 | 35 | 35 | 35 | 35 | 35 | 35 | 35 | 35 | 35 |
| Silane coupling agent | 3 | 3 | 3 | 3 | 3 | 3 | 3 | 3 | 3 | 3 | 3 | 3 |
| Terpene (co)polymer (1) | 2.5 | 5 | 10 | — | — | — | — | — | — | — | — | — |
| Terpene (co)polymer (2) | — | — | — | 2.5 | 5 | 10 | — | — | — | — | — | — |
| Terpene (co)polymer (3) | — | — | — | — | — | — | 2.5 | 5 | 10 | — | — | — |
| Terpene (co)polymer (4) | — | — | — | — | — | — | — | — | — | 2.5 | 5 | 10 |
| Stearic acid | 2.5 | 2.5 | 2.5 | 2.5 | 2.5 | 2.5 | 2.5 | 2.5 | 2.5 | 2.5 | 2.5 | 2.5 |
| Zinc oxide | 3 | 3 | 3 | 3 | 3 | 3 | 3 | 3 | 3 | 3 | 3 | 3 |
| Antioxidant | 2.0 | 2.0 | 2.0 | 2.0 | 2.0 | 2.0 | 2.0 | 2.0 | 2.0 | 2.0 | 2.0 | 2.0 |
| Wax | 1.2 | 1.2 | 1.2 | 1.2 | 1.2 | 1.2 | 1.2 | 1.2 | 1.2 | 1.2 | 1.2 | 1.2 |
| Step 2 | | | | | | | | | | | | |
| ENR | 40 | 40 | 40 | 40 | 40 | 40 | 40 | 40 | 40 | 40 | 40 | 40 |
| Step 3 | | | | | | | | | | | | |
| Sulfur | 1.6 | 1.6 | 1.6 | 1.6 | 1.6 | 1.6 | 1.6 | 1.6 | 1.6 | 1.6 | 1.6 | 1.6 |
| Vulcanization accelerator BBS | 1 | 1 | 1 | 1 | 1 | 1 | 1 | 1 | 1 | 1 | 1 | 1 |

TABLE 3-continued

| Compositions (part by weight) | Ex. | | | | | | | | | | | |
|---|---|---|---|---|---|---|---|---|---|---|---|---|
| | 17 | 18 | 19 | 20 | 21 | 22 | 23 | 24 | 25 | 26 | 27 | 28 |
| Evaluation | | | | | | | | | | | | |
| Rolling resistance index | 99 | 100 | 101 | 101 | 103 | 105 | 98 | 98 | 98 | 98 | 98 | 98 |
| Tear strength index | 100 | 100 | 100 | 103 | 104 | 104 | 101 | 101 | 100 | 101 | 101 | 100 |
| Filler dispersion index | 111 | 112 | 113 | 113 | 116 | 118 | 114 | 115 | 116 | 113 | 114 | 115 |
| Rubber hardness index | 98 | 97 | 96 | 98 | 97 | 96 | 98 | 97 | 96 | 99 | 98 | 97 |
| Ozone resistance test | C-3 | C-3 | C-3 | C-2 | C-2 | C-2 | B-2 | B-2 | B-2 | C-2 | C-2 | C-2 |
| Adhesion force index | 128 | 136 | 143 | 129 | 136 | 144 | 142 | 149 | 155 | 137 | 142 | 147 |
| DeMattia Flex crack growth test | | | | | | | | | | | | |
| 70% | 6.3 | 6.4 | 6.5 | 6.5 | 6.6 | 6.7 | 6.4 | 6.5 | 6.6 | 6.3 | 6.4 | 6.4 |
| 110% | 6.1 | 6.2 | 6.3 | 6.3 | 6.4 | 6.5 | 6.2 | 6.3 | 6.4 | 6.1 | 6.2 | 6.2 |
| Stretching fatigue test | ○ | ○ | ○ | ○ | ○ | ○ | ○ | ○ | ○ | ○ | ○ | ○ |

TABLE 4

| Compositions (part by weight) | Ex. | | | | | | |
|---|---|---|---|---|---|---|---|
| | 6 | 7 | 8 | 9 | 10 | 11 | 12 |
| Step 1 | | | | | | | |
| NR | 60 | 60 | 60 | 60 | 60 | 60 | 60 |
| Silica | 35 | 35 | 35 | 35 | 35 | 35 | 35 |
| Silane coupling agent | 3 | 3 | 3 | 3 | 3 | 3 | 3 |
| Soy bean oil | — | 2.5 | 10 | — | — | — | — |
| Aromatic oil | — | — | — | 2.5 | 10 | — | — |
| Terpene resin | — | — | — | — | — | 2.5 | 10 |
| Stearic acid | 2.5 | 2.5 | 2.5 | 2.5 | 2.5 | 2.5 | 2.5 |
| Zinc oxide | 3 | 3 | 3 | 3 | 3 | 3 | 3 |
| Antioxidant | 2.0 | 2.0 | 2.0 | 2.0 | 2.0 | 2.0 | 2.0 |
| Wax | 1.2 | 1.2 | 1.2 | 1.2 | 1.2 | 1.2 | 1.2 |
| Step 2 | | | | | | | |
| ENR | 40 | 40 | 40 | 40 | 40 | 40 | 40 |
| Step 3 | | | | | | | |
| Sulfur | 1.6 | 1.6 | 1.5 | 1.6 | 1.5 | 1.6 | 1.6 |
| Vulcanization accelerator BBS | 1 | 1 | 1 | 1 | 1 | 1 | 1 |
| Evaluation | | | | | | | |
| Rolling resistance index | 100 | 98 | 95 | 97 | 94 | 99 | 96 |
| Tear strength index | 100 | 93 | 90 | 96 | 92 | 96 | 94 |
| Filler dispersion index | 100 | 101 | 101 | 106 | 108 | 106 | 106 |
| Rubber hardness index | 100 | 98 | 94 | 100 | 95 | 98 | 97 |
| Ozone resistance test | C-3 | C-3 | C-3 | C-3 | C-3 | B-2 | B-2 |
| Adhesion force index | 100 | 100 | 100 | 103 | 105 | 132 | 144 |
| DeMattia Flex crack growth test | | | | | | | |
| 70% | 5.7 | 5.5 | 5.2 | 6.0 | 5.7 | 5.9 | 6.0 |
| 110% | 5.6 | 5.3 | 5.0 | 5.8 | 5.5 | 5.5 | 5.6 |
| Stretching fatigue test | x | x | x | x | x | x | x |

Rolling resistance and hardness were maintained and dispersibility of a filler such as silica and adhesion property was able to be improved by using the terpene (co)polymer having a number average molecular weight of at most 700 in place of aromatic oil, alternative aromatic oil and vegetable oil and fat such as soy bean oil and palm oil. Further, in Examples 1 to 16, wet skid property was maintained, abrasion resistance could be greatly improved, and in Examples 17 to 28, tear strength was kept and crack resistance could be improved. Particularly, in Examples 3 to 8, 11 to 16 and 20 to 28 in which a hydrogenated product of a terpene (co)polymer was used, ozone resistance was able to be improved.

According to the present invention, there can be provided a rubber composition which can obtain excellent processability, keeps rubber hardness and is excellent in dispersibility of a filler (in particular, white filler such as silica) by comprising a rubber component containing at least 50% by weight of a natural rubber and/or a modified natural rubber and a terpene (co)polymer having a number average molecular weight of at most 700 as a plasticizer in place of a petroleum oil.

In particular, abrasion resistance can be improved by using the rubber composition of the present invention for a tread, while keeping wet grip performance and rolling resistance property, and crack resistance performance can be improved by using the rubber composition of the present invention for a sidewall while keeping tear strength and rolling resistance property.

Further, a terpene (co)polymer is generally a resource other than petroleum, and can be contributed to the solution of environmental problems such as global warming due to $CO_2$ emission by reducing a material derived from petroleum resources.

Further, if a hydrogenated product of a terpene (co)polymer is used, ozone resistance can be improved.

What is claimed is:

1. A rubber composition comprising a rubber component, a terpene (co)polymer and silica, said rubber component containing a natural rubber and/or a modified natural rubber in an amount of at least 50% by weight, and said terpene (co)polymer having a number average molecular weight of at most 700.

2. The rubber composition of claim 1, wherein the terpene (co)polymer is hydrogenated.

3. A pneumatic tire comprising the rubber composition of claim 1.

4. The rubber composition of claim 1, wherein the amount of natural rubber or modified natural rubber is at least 85% by weight.

5. The rubber composition of claim 1, wherein the terpene (co)polymer has a glass transition temperature of at least −60° C. to −10° C.

6. The rubber composition of claim 1, wherein the number average molecular weight of the terpene (co)polymer is at least 150.

7. The rubber composition of claim 1, wherein the terpene (co)polymer is present in an amount of at least 0.5 part by weight to at most 50 parts by weight based on 100 parts by weight of the rubber component.

8. The rubber composition of claim 1 wherein the silica has a BET specific surface area of 20 to 600 m$^2$/g.

9. The rubber composition of claim 1 wherein silica is present in an amount of at least 5 parts by weight to at most 150 parts by weight based on 100 parts by weight of the rubber component.

* * * * *